Oct. 30, 1923.  
T. L. MUNROE  
1,472,666

TESTING AND SAFETY DEVICE FOR TRAPS

Filed June 24, 1922

WITNESSES  
Edw. Thorpe  
Harrison Off

INVENTOR  
Thomas Lawrence Munroe  
BY  
Munn & Co  
ATTORNEYS

Patented Oct. 30, 1923.

1,472,666

UNITED STATES PATENT OFFICE.

THOMAS L. MUNROE, OF FALL RIVER, MASSACHUSETTS.

TESTING AND SAFETY DEVICE FOR TRAPS.

Application filed June 24, 1922. Serial No. 570,650.

*To all whom it may concern:*

Be it known that I, THOMAS L. MUNROE, a citizen of the United States, and a resident of Fall River, in the county of Bristol and State of Massachusetts, have invented a new and Improved Testing and Safety Device for Traps, of which the following is a full, clear, and exact description.

This invention has relation to animal traps and has particular reference to a testing or safety device for mouse or rat traps, the same being in the nature of an improvement over my co-pending application Serial No. 353,469, filed January 23, 1920.

As an object the invention contemplates a testing and safety device for traps which is shiftable into the path of movement of the trap jaw when in set position to permit a limited movement of the same toward its closed position whereby the testing of the operation of the trigger actuated release mechanism may be accomplished.

As a further object the invention contemplates in combination with a trap of the character described a means shiftable into and out of the path of movement of the movable trap jaw for positively precluding accidental closure of the trap jaw while setting the same.

More specifically the invention contemplates in connection with a testing and safety device of the character described a means for respectively limiting the movement of said device to hold the same in operative and inoperative position and a means for frictionally retarding the movement of said device.

As a further object the invention contemplates an extremely simple and inexpensive safety device which is fool-proof in its manufacture and assembly with the trap and in its mode of operation.

With the above recited and other objects in view, the invention resides in the novel construction set forth in the following specification, particularly pointed out in the appended claims and illustrated in the accompanying drawing, it being understood that the right is reserved to embodiments other than those actually illustrated herein to the full extent indicated by the general meaning of the terms in which the claims are expressed.

In the drawing—

Figure 1:
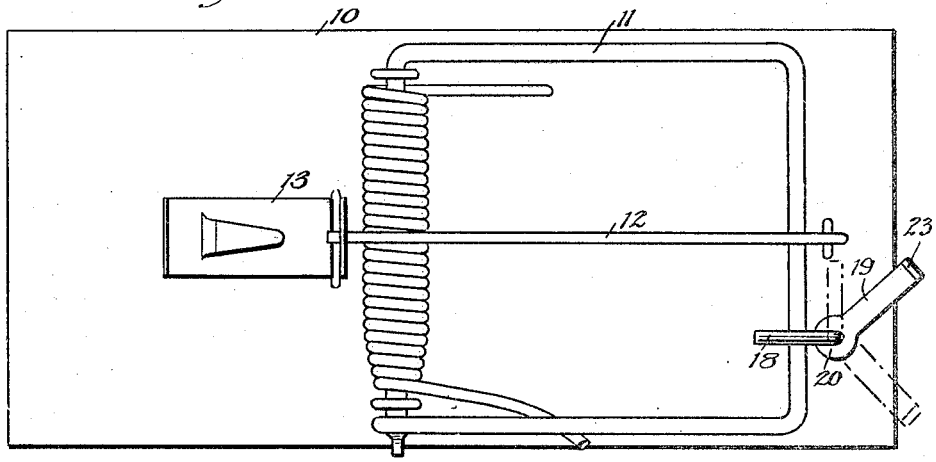
Figure 1 is a plan view of a commonly accepted form of mouse or rat trap equipped with a safety and testing device constructed in accordance with the invention and illustrating the same in operative position.

Referring to the drawings by characters of reference, 10 designates the base of a trap which is provided with the usual spring actuated movable jaw 11. The jaw 11 is maintained in open or set position by a pivoted retaining bar 12 engaged at its free extremity by a trigger 13 which supports the bait and effects the release of the retaining bar upon movement imparted thereto by the animal in its attempt to remove the bait.

The testing and safety device which constitutes the invention consists of a shiftable catch which is movable into and out of the path of movement of the movable jaw 11. The catch consists of a pin 15 which is provided at its lower extremity with a head 16. The pin is adapted to be positioned within a vertical aperture 17 adjacent to one end of the base 10 with the head lying below the under side of the base. The upper portion of the shank protrudes above the upper surface of the base and is provided with an angularly bent terminal 18 which constitutes a radially projecting abutment or arm adapted to be disposed respectively in or out of the path of movement of the movable jaw upon rotation of the pin in the aperture 17. In order to provide means for rotating the pin, a manipulating arm or lever 19 is attached to the pin above the upper surface of the base 10. As specifically illustrated the arm 19 constitutes a separate element and is attached to the shank of the pin by driving the inner enlarged apertured end 20 of the same over the enlarged peripherally fluted or ribbed portion 21 of the pin shank to key the arm to the shank for movement therewith. The outer extremity of the arm is bent upon itself to provide a depending stop lug 22 and an upstanding manipulating lug 23, the former lug 22 being so positioned with respect to the edge or end of the base 10 as to engage and coact therewith for limiting the rotation of the pin 15. In one position the lug 22 when engaged with the edge or end of the base 10 serves to dispose the terminal 18 directly over and in the path of movement of the movable trap jaw 11 when the same is in open or set position. In the other position, the lug 22 engages and coacts with the edge of the base to dispose the terminal 18 out of the path of movement of the movable jaw 11 when the same is in open or set position. In order to prevent the pin 15 which is loosely mounted in the aperture 17 from accidentally rotating during the handling of the trap, a frictional means for retarding the rotation of said pin has been devised which consists in interposing a coiled helical compression spring 24 between the upper surface of the base 10 and the under side of the inner end 20 of the arm, said spring surrounding the shank of the pin at this portion.

Figure 2:
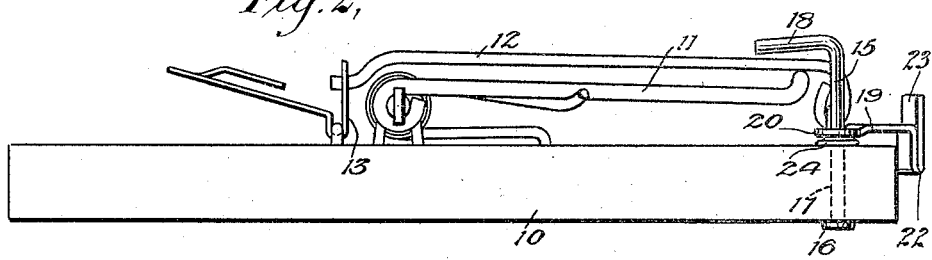
Fig. 2 is a side view thereof.
Figure 3:
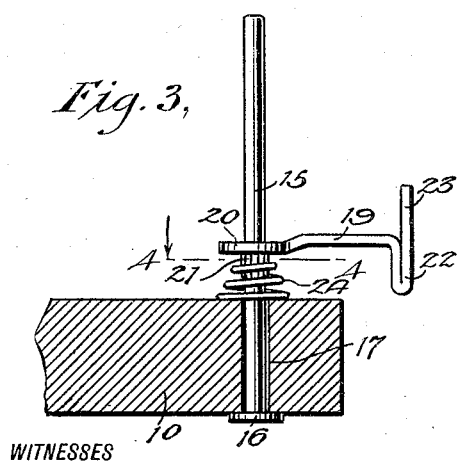
Fig. 3 is a fragmentary sectional view illustrating the manner in which the safety device is assembled with the trap.
Figure 4:
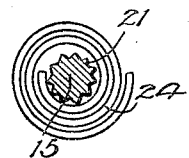
Fig. 4 is a sectional plan view taken approximately on the line 4—4 of Fig. 3.

In use and operation the upstanding lug 23 of the manipulating arm or lever 19 is employed as a handle for turning the pin 15. When the lug 22, as illustrated in full lines in Figs. 1 and 2, engages and coacts with the edge or end of the base 10, the terminal 18 will be disposed in its active position, that is, in superposed relation over the free end of the movable jaw 11 and in the path of movement of the same when said jaw is in open or set position. The terminal 18 is sufficiently spaced above the free end of the jaw 11 to admit of a test of the trigger 13 without danger of injury to the user. The terminal also in this position constitutes a safety means to protect the user in baiting and setting the trap. After the trap is baited and set as illustrated in Figs. 1 and 2 the upstanding lug 23 is employed as a handle for turning the pin 15 to the position illustrated in dotted lines when the depending lug 22 again contacts with the edge or end of the base, thus disposing the terminal 18 out of the path of movement of the movable jaw.

I claim:

1. A trap comprising a base, a movable jaw, and trigger release mechanism in combination with a safety catch rotatably mounted on said base and adapted to be moved so as to lie in the path of movement of said jaw while said trap is being set, and means engageable with the trap base for selectively stopping the movement of said catch in operative and inoperative positions.

2. The combination with a trap embodying a base, a movable jaw and a trigger actuated jaw releasing mechanism, of a testing and safety device therefor comprising a catch journaled in the base for rotation and extending upwardly therefrom, an angularly disposed upper extremity on said catch, a manipulating arm for said catch, and means on said arm engageable with the edge of the trap base for limiting the rotation of the catch to dispose the angular extremity respectively in and out of the path of movement of the movable trap jaw when the same is set.

3. The combination with a trap embodying a base, a movable jaw and a trigger actuated jaw releasing mechanism, of a testing and safety device therefor, comprising an apertured portion in the base, a pin journaled in said apertured portion for rotation and extending upwardly from the base, said pin having a head at its lower end engageable with the under side of the base and having an angularly disposed upper end constituting an abutment, a manipulating arm provided on said pin for rotating the same, said arm being bent upon itself at its free end to provide a depending stop element engageable with the edge of the base for limiting the rotation of the pin whereby to dispose the angular terminal respectively in and out of the path of movement of the movable trap jaw when the same is set or open.

4. The combination with a trap embodying a base, a movable jaw and a trigger actuated jaw releasing mechanism, of a testing and safety device therefor, comprising an apertured portion in the base, a pin journaled in said apertured portion for rotation and extending upwardly from the base, said pin having a head at its lower end engageable with the under side of the base and having an angularly disposed upper end constituting an abutment, a manipulating arm provided on said pin for rotating the same, said arm being bent upon itself at its free end to provide a depending stop element engageable with the edge of the base for limiting the rotation of the pin whereby to dispose the angular terminal respectively in and out of the path of movement of the movable trap jaw when the same is set or open, and means surrounding the pin and interposed between the manipulating arm and the upper surface of the trap base for frictionally retarding the rotation of the pin.

5. In a trap testing and safety device comprising a rotary pin and an operating handle therefor, a lock joint formed by so shaping said pin cross-sectionally as to cause a portion of the same to be embedded into the adjacent portion of said handle when said parts are forced together.

6. The combination with a trap embodying a base, a movable jaw and a trigger actuated jaw releasing mechanism, of a testing and safety device therefor, comprising an apertured portion in the base, a pin journaled in said apertured portion and extending upwardly from the base, said pin having a head at its lower end engageable with the under side of the base and having an angularly disposed upper end constituting an abutment, and a manipulating arm provided on said pin for rotating the same, said manipulating arm being forced on said pin and frictionally held thereto.

7. The combination with a trap embodying a base, a movable jaw and a trigger actuated jaw releasing mechanism, of a testing and safety device therefor, comprising an apertured portion in the base, a pin journaled in said apertured portion for rotation and extending upwardly from the base, a fluted portion on said pin above the base, said pin having a head at its lower end engageable with the under side of the base and having an angularly disposed upper end constituting an abutment, a manipulating arm provided on said pin for rotating the same, said arm being apertured at its inner end and forced over the fluted portion of said pin to lock the same against relative rotation, said arm being bent upon itself at its free end to provide a depending stop element engageable with the end of the base for limiting the rotation of the pin whereby to dispose the angular terminal in and out of the path of movement of the movable trap jaw when the same is set or open.

THOMAS L. MUNROE.